(No Model.) 7 Sheets—Sheet 3.

J. H. COOPER & W. J. FORD.
CIRCULAR KNITTING MACHINE.

No. 364,806. Patented June 14, 1887.

Witnesses.

Inventors.

(No Model.) 7 Sheets—Sheet 4.
J. H. COOPER & W. J. FORD.
CIRCULAR KNITTING MACHINE.

No. 364,806. Patented June 14, 1887.

(No Model.) 7 Sheets—Sheet 5.

J. H. COOPER & W. J. FORD.
CIRCULAR KNITTING MACHINE.

No. 364,806. Patented June 14, 1887.

Witnesses.

Inventors.

(No Model.) 7 Sheets—Sheet 6.

J. H. COOPER & W. J. FORD.
CIRCULAR KNITTING MACHINE.

No. 364,806. Patented June 14, 1887.

WITNESSES
Ed. A. Newman.
Al. C. Newman.

INVENTORS
John Harris Cooper,
William James Ford
By their Attorneys

UNITED STATES PATENT OFFICE.

JOHN HARRIS COOPER, OF EVINGTON, COUNTY OF LEICESTER, AND WILLIAM JAMES FORD, OF HUMBERSTONE, COUNTY OF LEICESTER, ENGLAND.

CIRCULAR-KNITTING MACHINE.

SPECIFICATION forming part of Letters Patent No. 364,806, dated June 14, 1887.

Application filed August 4, 1884. Serial No. 139,614. (No model.) Patented in England January 19, 1884, No. 1,788; in France July 17, 1884, No. 163,349, and in Germany July 25, 1884, No. 32,607.

*To all whom it may concern:*

Be it known that we, JOHN HARRIS COOPER, of Evington, in the county of Leicester, and Friars Causeway, Leicester, England, hosiery-manufacturer, and WILLIAM JAMES FORD, of Humberstone, in the county of Leicester, England, manufacturer, subjects of the Queen of Great Britain, have invented certain new and useful Improvements in Circular-Knitting Machines, (for which we have received Letters Patent in Great Britain, No. 1,788, dated January 19, 1884; in France, No. 163,349, dated July 17, 1884, and in Germany, No. 32,607, dated July 25, 1884,) of which the following is a specification.

Our invention relates to a circular-knitting machine of the class adapted to the production of socks or stockings thickened at parts, and in which a fixed inner cylinder carries a circle of needles which are operated by cams carried by an outer cylinder, to which is imparted either a rotary movement or a movement of rotary reciprocation, according to whether all of the needles are operated to produce tubular work, or part only of the needles are operated, as when the heel of a sock or stocking is being produced.

Our improvements consist in certain combinations of mechanism, to be hereinafter designated by the claims, constituting novel means for producing a sock or stocking with the work thickened at desired points by the laying in of a splicing or thickening thread.

The accompanying drawings show all those parts of a suitable old machine to which our improvements are adapted, illustration of which is thought to be required in order to convey a proper understanding of our invention.

Fig. 5 is a side elevation, partly in section, and Fig. 6 an end view, of the machine with parts broken away, showing a preferred construction of the mechanism for controlling the laying in of the splicing or thickening thread. Figs. 7 to 11, inclusive, are detail and diagrammatic views. Of these views.

A is the needle-head or fixed inner cylinder, provided with vertical tricks or grooves around its outer wall or periphery for the stems of the circle of needles $a$ to slide in. One of these tricks or grooves, A', is shown by dotted lines in Fig. 1. (See also dotted lines, Fig. 5.)

B is the outer or cam-carrying cylinder, to which a movement of rotation or rotary reciprocation is imparted.

B' B² B³ are the fixed cams, and $b\ b'$ the movable cams carried by the cylinder B at its inner side for acting on the butts of the stems of the needles. The movable cams slide vertically in suitable guide-ways in the cylinder, and have pins $b^2\ b^2$ fixed to them and projecting through slots in the cylinder.

C is the driving-ring or toothed wheel driven by a bevel-wheel, C', on a driving-shaft, C². (See dotted lines, Fig. 2.) By means of a crank on the driving-shaft it may be turned by hand. The driving-ring is suitably supported by the centrally-open circular base or frame A² of the machine, so as to turn freely in the annular slot or way $a'$ of the frame.

D is a standard fixed to and rising up from the driving-ring. The rotating cam-carrying cylinder B is provided at diametrically-opposite points with projections or lugs E E. The base of the standard projects laterally in opposite directions, forming the two curved portions D' D', one or the other of which comes in contact with one or the other of the lugs E E, according to the direction in which the driving-ring is turned, and in this way the cam-carrying cylinder is caused to turn with the driving-ring.

The driving-ring is provided with the cam E' for raising the sliding cams $b\ b'$ by acting on their pins $b^2\ b^2$. One or the other of these sliding cams, according to the direction in which the driving-ring is turned, is held in proper position to insure that the needles are in turn properly raised to receive thread just before they are made to descend for the work upon them to be knocked off, as usual.

The mechanism above referred to and in part described is essentially such in construction and operation as commonly employed in this class of machines, and it will be seen that movement of continuous rotation of the driving-ring or turning movement, first one way and then the other, imparts like movement to the cam-carrying cylinder and operates the needles. An inwardly-projecting arm or "yard," carried by and rigidly attached to the upper end of the standard D, has at its inner end a thread-eye, $D^\times$, which, as the standard turns with the driving-ring, rotates or reciprocates above the needle-cylinder and close to the needles. The main thread Y, or that which is supplied for producing the bulk of the work, passes to the thread-eye from a bobbin suitably supported, as heretofore, either at a distance above and centrally over the circle of needles, or in any convenient way adjacent to the machine, and if in the latter way the thread in passing to the thread-eye would be led by way of a controlling-guide located at a distance above and centrally over the circle of needles, as usual.

Figure 12:
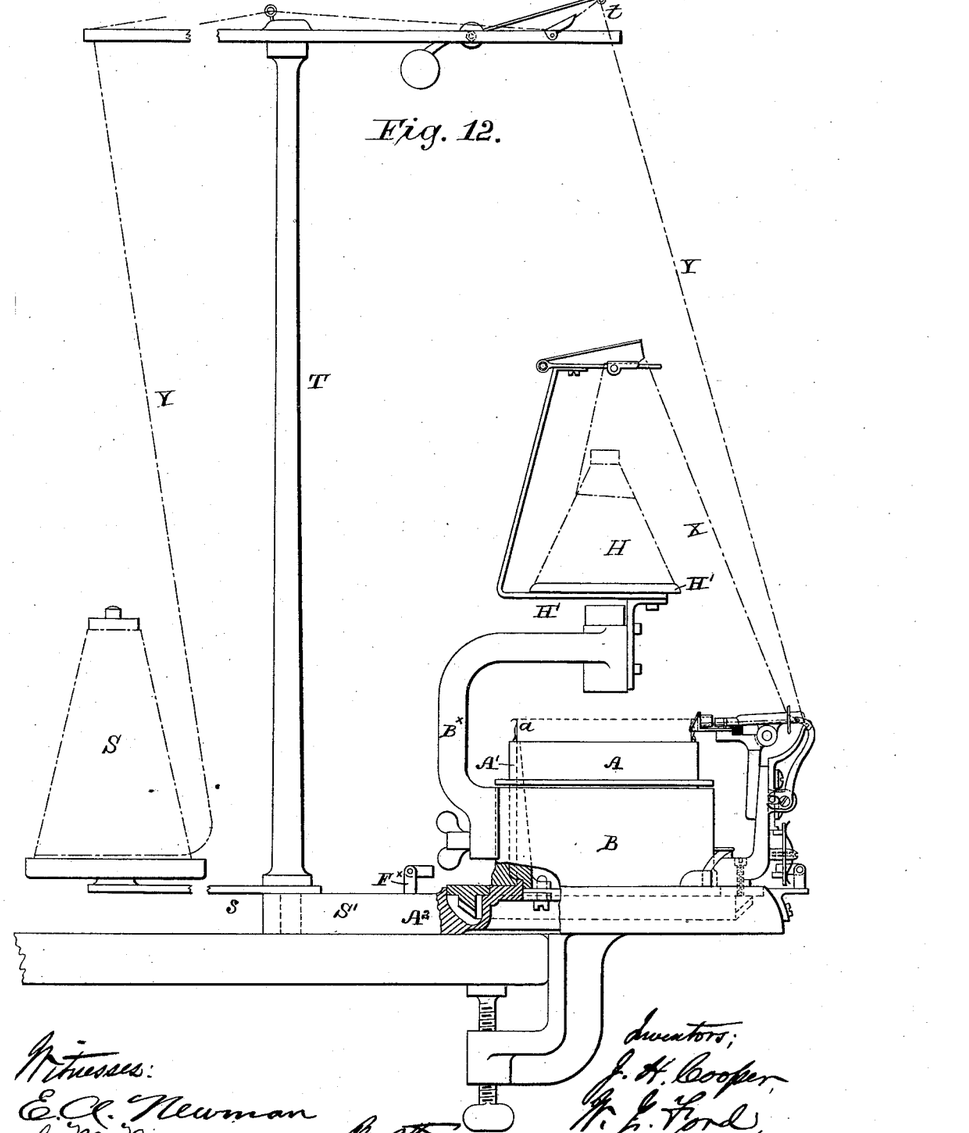
Fig. 12 is a side elevation, partly in section, with parts broken away, designed to show a suitable way of supporting the bobbin of main thread and locating a controlling-guide for this thread above the bobbin of thickening-thread and centrally over the circle of needles.

In Fig. 12 the main-thread bobbin S is shown as carried by an arm, $s$, secured to the projection S' of the supporting-frame $A^2$, while the controlling-guide $t$ for the main thread is properly located by being supported by way of the post T, secured at its lower end to the frame projection S'.

The splicing or thickening thread X is supplied from a bobbin, H, mounted on a bobbin-carrier, H', centrally over the circle of needles and supported by a bracket, $B^\times$, rigidly attached at its base to the turning cam-carrying cylinder B. The bobbin-carrier for the splicing-thread is thus beneath the bobbin-carrier or controlling-guide for the main thread, as the latter is usually located as above explained.

A plate, K, by which to direct the splicing or thickening thread to the thread-eye $D^\times$ and to clamp this thread when it is not to be supplied to the needles, is jointed to the upper end of the standard D, as at G. The main thread Y is led to the thread-eye by way of a suitable guide, $y$, at one side of the outer end of the plate K, the main thread passing from this guide to the thread-eye above the plate. The thickening-thread X is led down through a hole, $K^2$, in this plate and then again upward through another hole, $K^3$, before passing to the thread-eye $D^\times$. A short length of the thickening-thread X is in this way exposed below the under side of the plate K. Below this portion of the thread is a pad of leather or india-rubber, L, in order that when the inner end of the plate K is pressed downward the thread may be nipped and held between the under side of the plate and the elastic pad, and so be prevented from passing to the thread-eye. Consequently the thread will then be broken between the thread-eye and the needles; but so soon as the inner end of the plate K is again allowed to rise away from the pad L the thickening-thread will be again set free and will then be carried along by the friction against it of the other thread Y, by which the bulk or body of the work is produced, and with it will be laid onto the needles.

Figure 1:
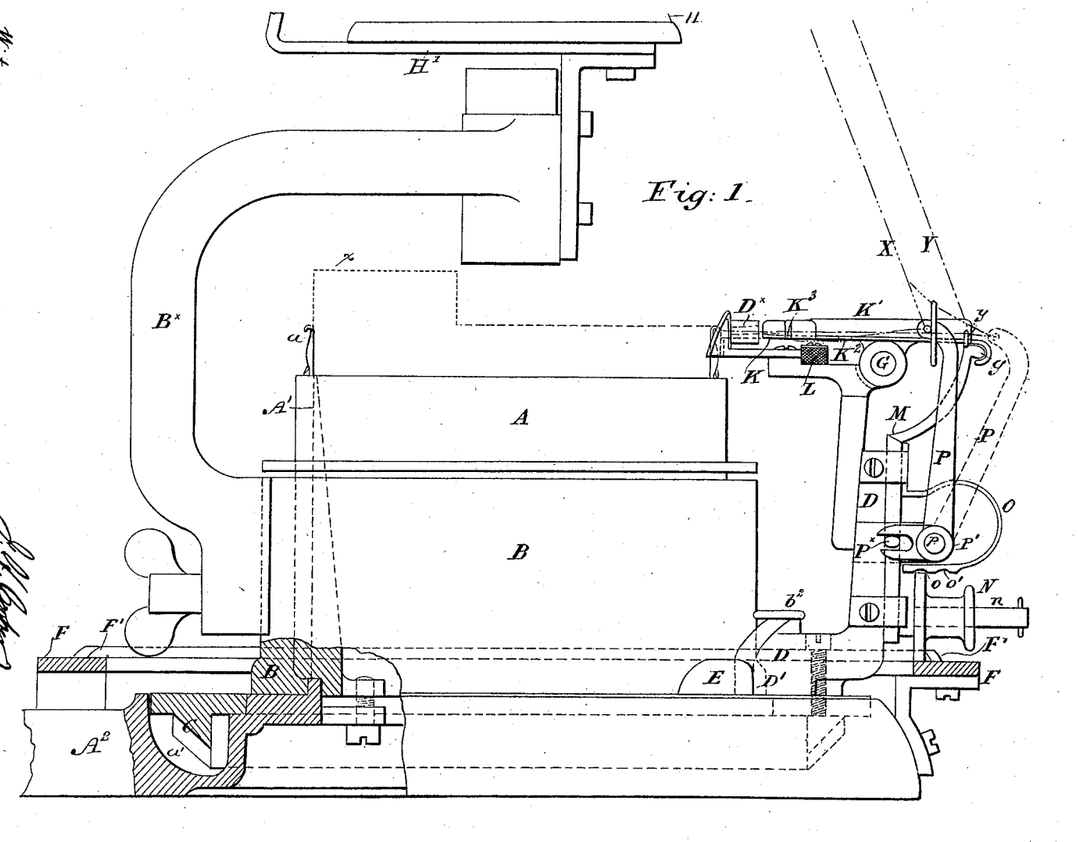
Figure 1 is a side elevation, partly in section, and Fig. 2 a plan view, of the machine with parts broken away.
Figure 2:
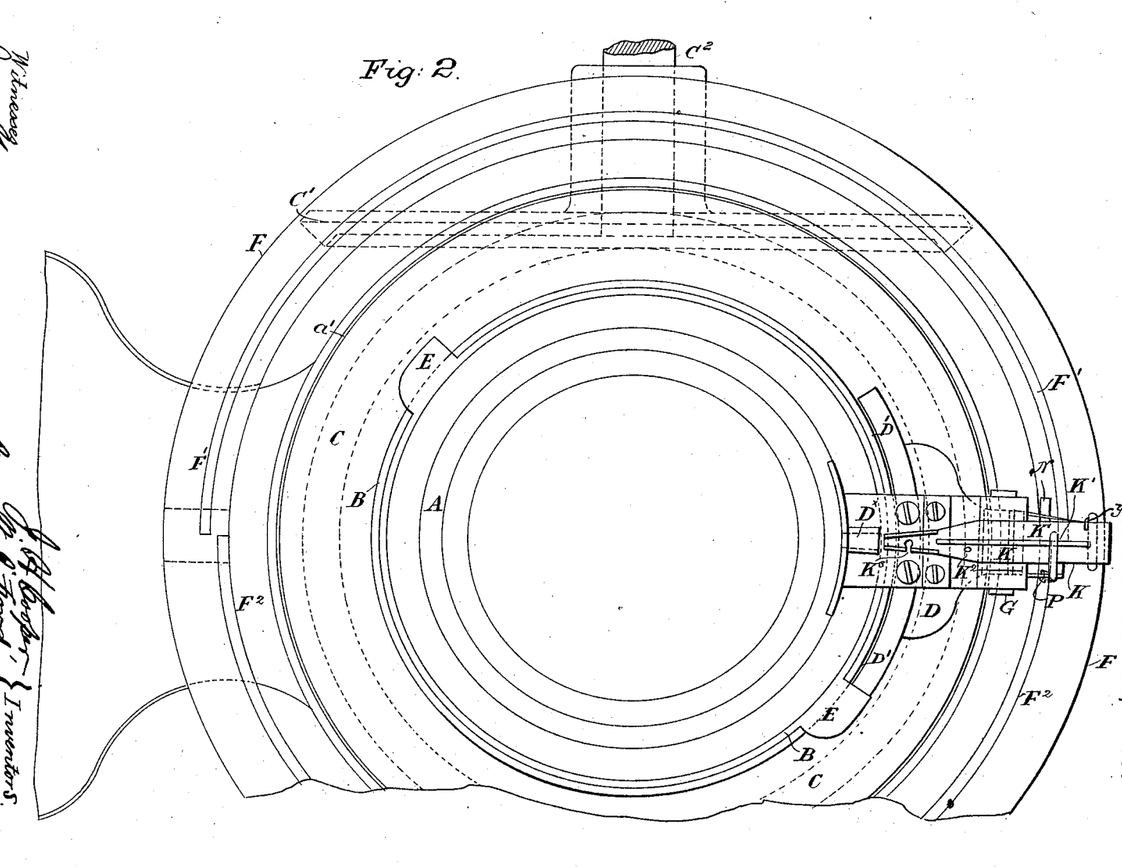

We provide suitable controlling mechanism for automatically turning the plate K upon the hinge-joint G to govern the times at which the splicing or thickening thread shall be nipped or set free. This controlling mechanism may be formed in various ways. We prefer the construction shown by Figs. 5 and 6, and to be farther on described. In Figs. 1 and 2 it is shown to be formed in the following way: A fixed annular ring, F, concentric with the cylinders A B, carries curved ribs or cam-surfaces $F'\ F^2$, constituting segments of circles also concentric with the cylinders. The outer end of the plate K is bent or formed into a hook or socket, $g$, which embraces a lug at the top of a slide, M. This slide can rise or fall vertically in suitable guides on the standard D. The lower end of the slide M carries, by a shaft, $n$, a roller, N, which can be made to rest upon either one or other of the two cam-surfaces $F'\ F^2$, one of which is somewhat nearer to the center of the cylinders than the other. In Fig. 1 the roller is shown as adapted to slide on its shaft and to be held in position over either one or other of these cam-surfaces by being engaged in either one or other of two notches, $o\ o'$, in a spring, O; or the roller can be drawn outward away from the cylinders, so as not to be engaged by either notch, and would then be held entirely out of action.

Figure 3:
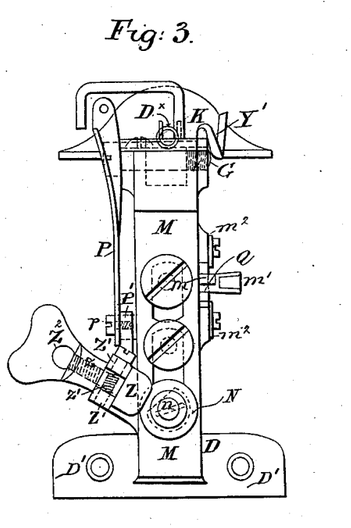
Figs. 3 and 4 are an end view and a side elevation, respectively, representing in a somewhat modified form part of the mechanism used for controlling the laying in of the splicing or thickening thread.
Figure 4:
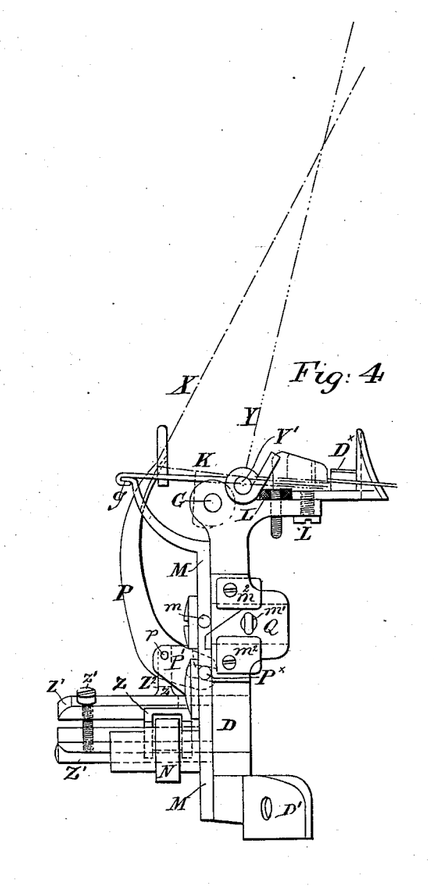

Other controlling mechanism might be adopted for holding the roller in either one or other of its three positions. For example, it may be embraced at its circumference by a sliding fork, Z, as shown in Figs. 3 and 4. This fork has a shank, $z$, by way of which it is supported and guided in a way formed between two bars, $Z'\ Z'$, fixed to the standard D and projecting outwardly therefrom. The fork-shank is threaded, and a thumb-nut, $Z^2$, engaging the shank, serves to clamp the fork in any desired position. The outer ends of the bars Z' Z' are provided with a screw, $z'$, serving not only to brace the bars by uniting them, but also to guard against accidental removal of the fork.

The plate K may either be made, as shown at Figs. 1 and 2, with a rib, K', standing up from it, and have the main thread Y for producing the bulk of the work led to the thread-eye above the plate at one side of this rib, while the splicing or thickening thread X is led along the plate on the opposite side of this rib, so that the two threads cannot come into contact with one another until just before they enter the thread-eye $D^\times$; or the rib may be dispensed with and the main thread Y be led through a guide-eye, Y', at one side of the plate K, as shown at Figs. 3 and 4, by which the same object will be effected.

In order that the splicing-thread may be tightened up just at the time when it is to be broken, and may be slackened so soon as it is again to be laid onto the needles, as during the formation of rectangular thickening-patches, the thread is passed through an eye in a lever, P, which has jointed connection with the standard D. A fixed lug, P', of the standard and a pivot-pin, $p$, serve to make this jointed connection. A pin, $P^\times$, which projects from the slide M, is made to enter a slot in the short arm of this lever, as shown in Fig. 1, so that when the slide rises and causes the thread to be broken the upper end of the lever P moves away from the thread-eye and tightens the thread in the manner shown by dotted lines in Fig. 1; but when the slide moves downward, and so releases the thread from being held by the clamping devices of the controlling mechanism, the upper end of the lever moves inward and slackens the thread, thus facilitating the operation of the main thread upon the thickening-thread in drawing it along by frictional contact. It will be seen that with the roller N in such a position as to be brought into contact with one of the cam-surfaces F' F², when the cylinder B is revolved continuously in one direction, a thickening-thread will be laid in short lengths into the work at the front of the stocking, as is required when thickening the stocking at the knee; and that with the roller in position to be brought into contact with the other cam-surface a thickening-thread will be laid in short lengths into the work at the back of the stocking, as is required when it is desired to thicken the work above the heel, or in the heel itself, or in the under side of the foot during continuous rotation of the cylinder B. It will be understood that for that part of each revolution of the cylinder during which the roller N is acted on by one of the cam surfaces the supply of thickening-thread ceases, while during the remainder of the revolution this thread is supplied to the needles, the result being that a rectangular patch of thickened work is produced by the laying in of the short parallel lengths of thickening-thread. When a continuous length of unspliced work is to be produced, the roller is drawn away from the cams and the slide M is held up by a sliding bolt, Q. (Shown at Fig. 4.) The bolt is formed with an incline on its end, which, when the bolt is moved endwise toward the slide, comes against a pin, $m$, which stands out from the slide, and so lifts the slide and holds it up. A set-screw or thumb-nut, $m'$, and a suitable guideway, $m^2$, on the standard D, provide in obvious way for supporting and adjusting the sliding bolt.

Figures 5, 6:
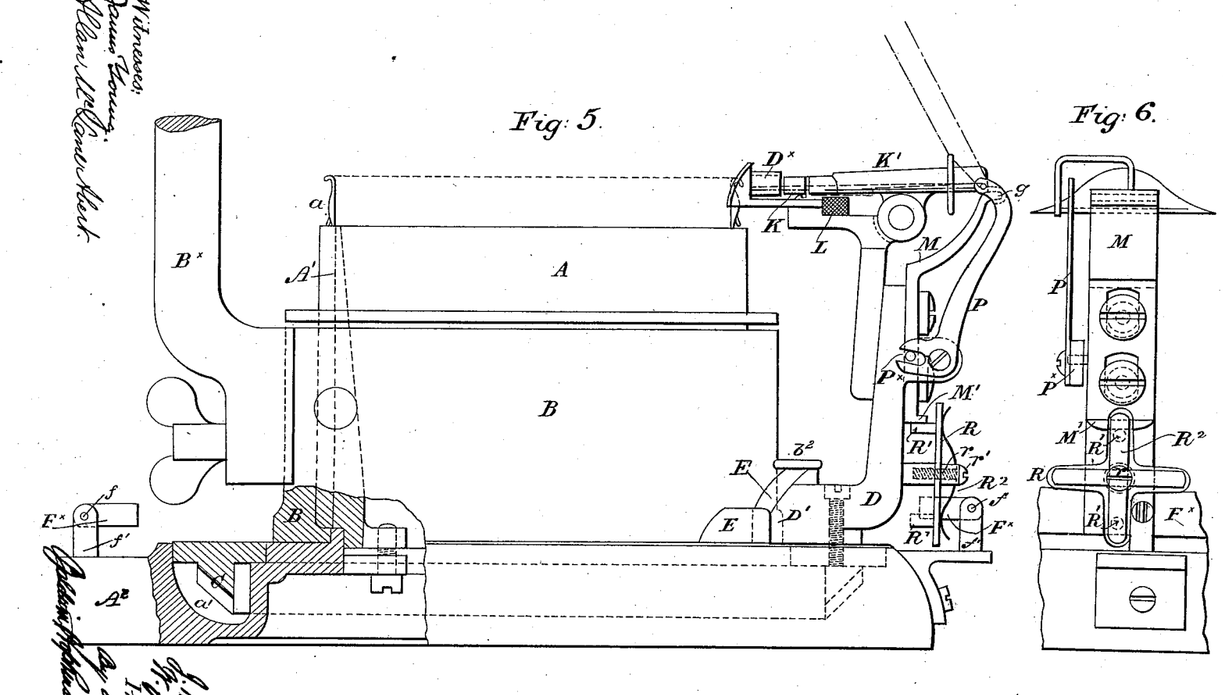
Figure 7:
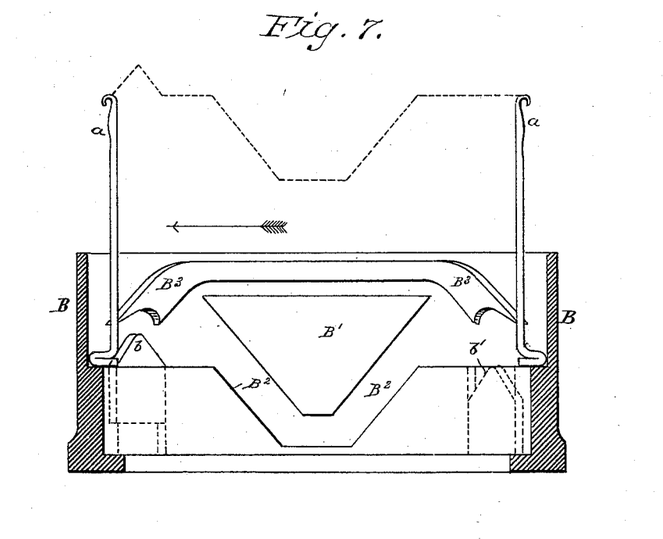
Fig. 7 is a vertical central section of the cam-carrying cylinder with two of the needles in position, their cylinder being omitted.
Figures 8, 9:
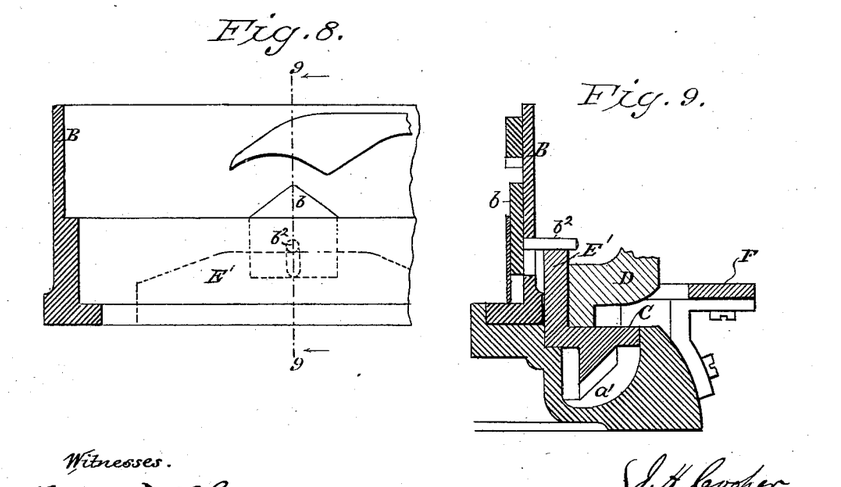
Fig. 8 is another vertical section of the cam-carrying cylinder, part of the cylinder being broken away.
Fig. 9 is a vertical section in the plane of the line 9 9, Fig. 8, showing portions of the cam-carrying cylinder and adjacent parts.
Figure 10:
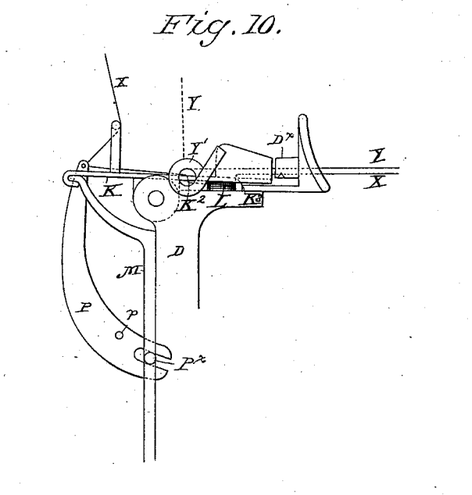
Figs. 10 and 11 are elevations showing portions of the mechanism for controlling the laying in of the thickening-thread, the thickening-thread being represented as clamped in the one view and unclamped in the other.
Figure 11:
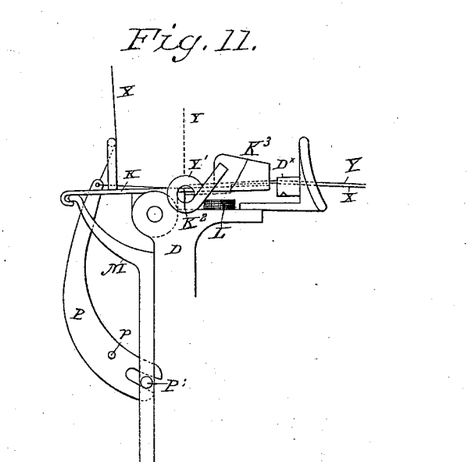

In accordance with the construction shown in Figs. 5 and 6, in place of the slide M being made to rise and fall at the required times by a roller carried by it being brought into contact with cam-surfaces F' or F², the slide M is raised at the times required by the actuation of a rotating wheel, R, mounted upon an axis or stud shaft, $r$, carried by the standard D. In this case the cam-surfaces F' and F² are done away with and are replaced by two jointed pegs, $F^\times$, at opposite sides of the machine. The wheel R is formed with four radial spokes, and these are in succession brought against the pegs $F^\times$ when the driving-ring C is revolved, and each time that one or other of the radial arms comes against one of the pegs a quarter-turn is given to the wheel. Two opposite arms of the wheel have pins R' projecting from them. Whenever one of these comes against a projection, M', which stands out from the slide M, the slide is raised, while when one of the radial spokes which does not carry a pin, R', comes opposite to the slide M the slide drops. The slide will thus be held up for one half of a revolution of the driving-ring C and lowered for the other half.

The wheel R is prevented from turning too freely by friction applied to it by a spring, R², having arms bearing against the wheel-arms, as shown. A screw, $r'$, serves to fix the spring to the stud-shaft $r$. When the pegs $F^\times$ are not required to act upon the wheel R, they may be turned outward upon hinge-joints $f$, so as not to act upon it. These hinge-joints connect the pegs with the fixed studs $f'$.

It will be seen that by carrying the bobbin of splicing or thickening thread by the cylinder B the thread does not get twisted by the revolution of the cylinder, and as it is carried above the needle-cylinder and concentrically therewith it is out of the way of all the other parts of the machine.

In forming a sock or stocking upon the machine a tubular piece of work for the leg-piece is first made to any desired length, and assuming that the mechanism for controlling the laying in of the thickening-thread is such as shown by Figs. 1 and 2 or Figs. 3 and 4, the operation as continued is as follows: When the work is not being thickened, the slide M is held up by the bolt Q, so that the clamp-plate continuously nips and retains the thickening-thread; but if this piece of work is to be thickened at the knee the bolt is suitably adjusted and the roller N put into position to be acted on by the inner cam, F², during the time that such thickened work is being produced. When the greater part of the leg-piece has been produced, and it is then required to thicken the remainder of the leg-piece around that part of its circumference which comes above the heel, the slide M is again set free to rise and fall and the roller N is moved into position to be acted upon by the outer cam, F'. Any desired number of courses of tubular work are then produced, which will be thickened by a rectangular "patch" at that part which will come above the heel-piece. So soon as the desired number of courses have been completed the machine is stopped, and the needles which are not required to be in use during the time that the heel is being formed and upon which unthickened work had previously been produced are now lifted up so as to bring them into the position indicated by dotted lines at *x* in Fig. 1. When raised into this position, they are not acted upon by the cams carried by the cylinder B, and are entirely out of action, but the loops of work still remain upon them. The roller N is now drawn into its outermost position, so that it will not be acted upon by either of the cams F' F², and the splicing or thickening thread will therefore remain continuously unbroken. A reciprocating motion is now given to the driving-axis, first in one direction and then in the opposite direction, to produce work upon such of the needles only as have not been raised, and at the end of each course of work the end needle of the row of needles upon which work is being produced is lifted, and so put out of action. In this way a tapered piece of thickened work is produced. Afterward an equal number of thickened courses are produced in the same way; but at the end of each course, instead of putting the end needle out of action, one of the needles which had previously been put out of action is again brought into action until the whole of the needles upon which thickened work was originally being produced have thus been brought again into work. This completes the formation of the heel, and during the whole of this time the thickening-thread remains unbroken. When the heel has been finished, the roller N is again made to rest on the cam-surface F', and the needles upon which unthickened work had previously been produced are lowered, so as again to bring them into work. A continuous revolving motion is then given to the machine, so as to produce a tubular piece of work for forming the foot of the sock or stocking, and this piece of work will be thickened around that part only of the circumference which is to come on the under side of the foot. When sufficient thickened work has been produced, the slide M may again be held up continuously by the bolt Q, so as continuously to hold back the thickening-thread, in order that plain unthickened work may then be produced in forming part of the foot, until a sufficient length has been made for forming the foot, except the toe portion. The toe-piece can be formed or fashioned in any ordinary way.

From the above description the operation of the mechanism for controlling the laying in of the thickening-thread when of the preferred construction, such as shown by Figs. 5 and 6, will readily be understood.

It will be seen that as by our improvements the main thread is brought into contact with the thickening-thread when the two threads are about to enter the thread-eye, and that as the point at which the thickening-thread is clamped, and between which point and the needles it is broken, is very close to the needles, entanglement of the threads is prevented, and it is rendered practicable to use lengths of thickening-threads as short as may be desired.

We claim as our invention—

1. The combination of the circle of needles, the fixed inner cylinder carrying the needles, the turning outer cylinder, the cams carried thereby for actuating the needles to produce work, in whichever direction this cylinder is turned, the driving-ring, by engagement with which the cam-carrying cylinder is turned, means for turning the driving-ring, the standard turning with the driving-ring, the yard supported by the standard and having the thread-eye above the needle-carrying cylinder and close to the needles, the holder for the bobbin of thickening-thread centrally above the circle of needles and carried by and turning with the cam-carrying cylinder, the controlling-guide for the main thread above the bobbin of thickening-thread and centrally over the circle of needles, the hinged clamp-plate, the slide connected with the clamp-plate and by the actuations of which the thickening-thread is clamped and released near the thread-eye, and means for actuating said slide, substantially as and for the purpose set forth.

2. The combination of the fixed inner cylinder carrying a circle of needles, the turning outer cylinder carrying cams for actuating the needles to produce work, in whichever direction this cylinder is turned, the driving-ring, by engagement with which the cam-carrying cylinder is turned, means for turning the driving-ring, the standard carried by the driving-ring, the yard carried by the standard and having the thread-eye close to the needles above their cylinder, the holder for the bobbin of thickening-thread centrally above the circle of needles and carried by and turning with the cam-carrying cylinder, the main thread-controlling guide above the bobbin of thickening-thread and centrally over the circle of needles, the hinged clamp-plate, the slide connected with the clamp-plate, and by the actuations of which the clamp-plate is caused to clamp and release the thickening-thread near the thread-eye, the means for actuating the clamp-slide, and the lever actuated by the clamp-slide for tightening and slackening the thickening-thread, substantially as and for the purpose set forth.

3. The combination of the frame, the fixed inner cylinder carrying a circle of needles, the turning outer cylinder having cams for actuating the needles, the driving-ring, by engagement with which the cam-carrying cylinder is turned, means for turning the driving-ring, the standard turning with the driving-ring, the yard supported by the standard and having the thread-eye close to the needles above their cylinder, the hinged clamp-plate carried by said standard, the slide supported by the standard and having connection with the clamp-plate, the armed wheel mounted upon a stud carried by the standard, pins carried by opposite arms of the wheel acting on the clamp-slide, and the pivoted pegs of the frame acting upon the arms of the wheel, substantially as and for the purpose set forth.

JOHN HARRIS COOPER.
WILLIAM JAMES FORD.

Witnesses:
ALFRED BROMWICH,
   39 *King Richard's Road, Leicester,*
STEPHEN PEAKE,
   87 *Chester Street, Leicester.*